Oct. 17, 1950     I. SHAPIRO     2,525,959
DEVICE FOR POSITIONING X-RAY FILM TO DENTAL CONES
Filed Oct. 2, 1946     2 Sheets-Sheet 1
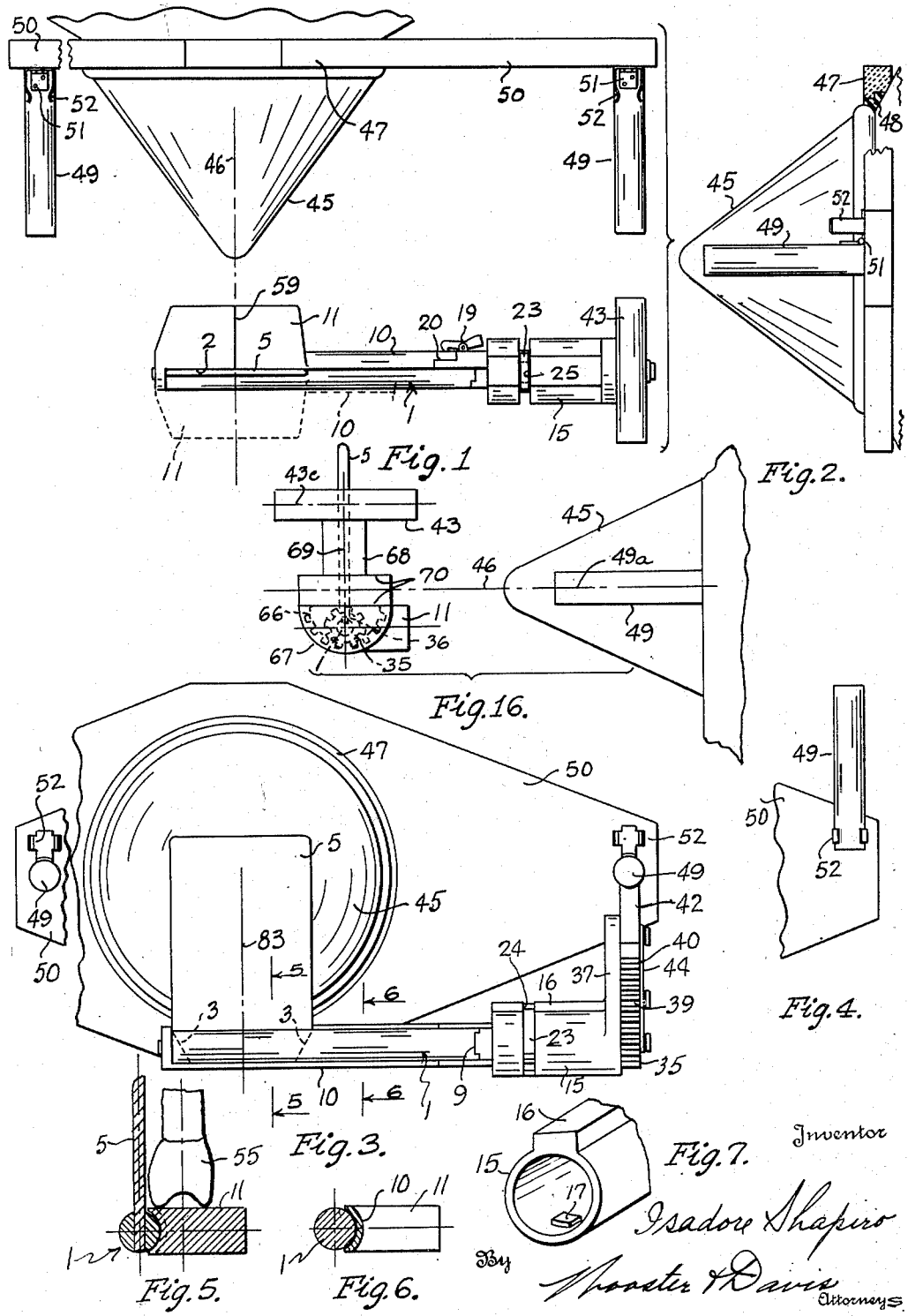
Inventor
Isadore Shapiro
By Wooster & Davis
Attorneys Oct. 17, 1950     I. SHAPIRO     2,525,959
DEVICE FOR POSITIONING X-RAY FILM TO DENTAL CONES
Filed Oct. 2, 1946     2 Sheets-Sheet 2
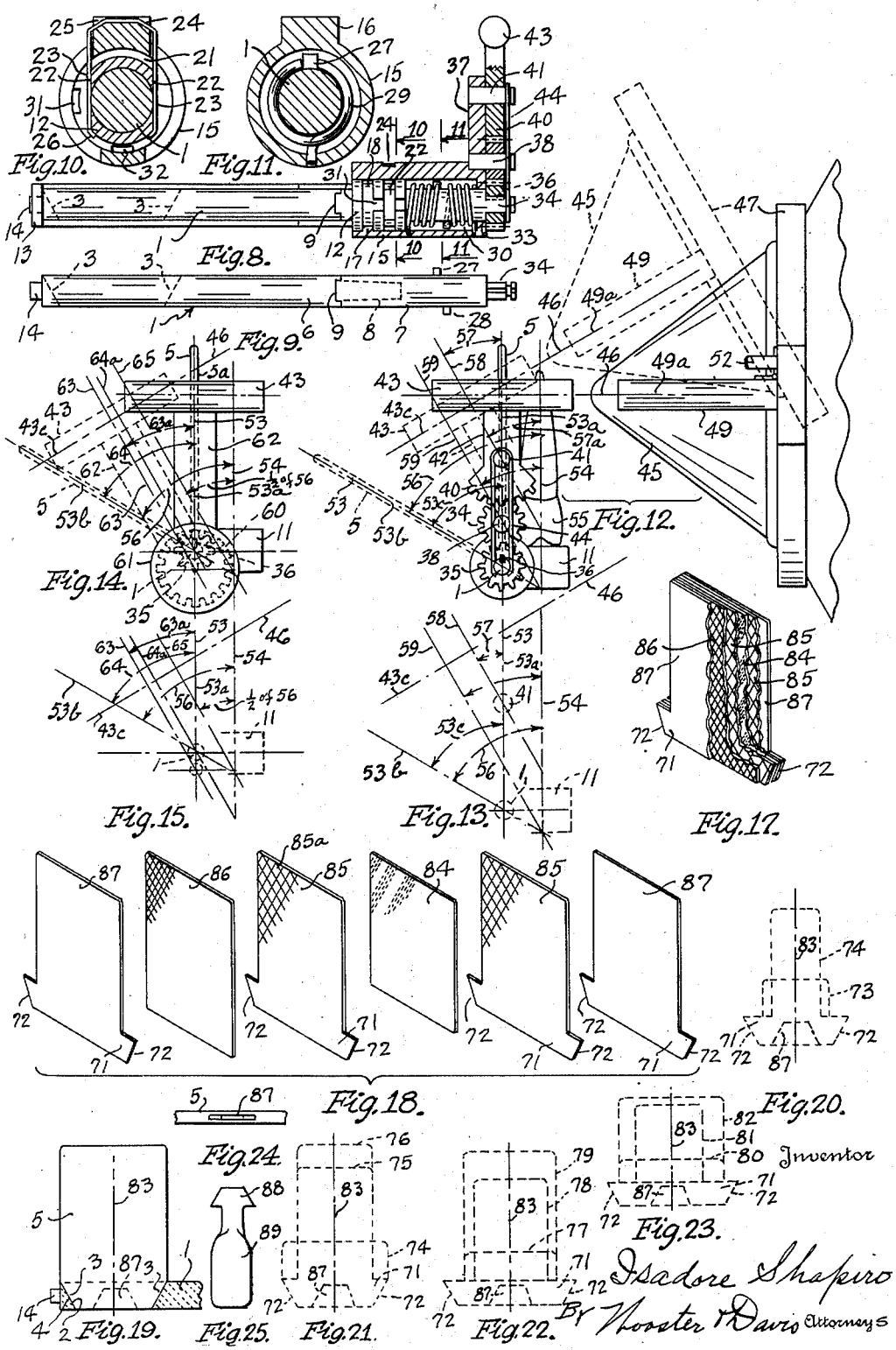

Patented Oct. 17, 1950

2,525,959

UNITED STATES PATENT OFFICE 2,525,959

DEVICE FOR POSITIONING X-RAY FILM TO DENTAL CONES

Isadore Shapiro, Danbury, Conn.

Application October 2, 1946, Serial No. 700,805

15 Claims. (Cl. 250—64)

This invention relates to a device for positioning X-ray film in the proper relation to the cone of the X-ray machine in making X-ray photographs of teeth in the patient's mouth. In order to produce an accurate image of the tooth, the central ray from the X-ray machine funnel must be projected perpendicularly to a plane bisecting the angle formed by the longitudinal axis of the tooth and the plane of the film packet, because the arrangement of the teeth and the shape of the jaw is such that when the film packet is placed behind the tooth and against the tissues behind the tooth it is inclined to the axis of the tooth and not parallel with it. At the same time the ray must pass straight through the interproximal spaces to preclude the overlapping of the images of the crowns of the adjacent teeth. Of equal importance is the care to avoid bending of the film to assure a flat film surface and thus preclude distortion of the image which is sure to result if this is not carefully observed. As long as the patient is depended upon to hold the film in position by finger pressure, it is practically impossible to assure there is no bending of the film. A rigid device that will retain the film to the exclusion of any manual manipulation on the part of the patient and still comply with the above, would be the ideal. Further, since dental films are made of different widths to conform to the varying concave surfaces of the maxillae, the position of each in the device must be such that the central ray should automatically be centered in projection in each case.

It is therefore an object of the present invention to provide a device in which the central ray from the X-ray machine will be projected perpendicularly to the plane bisecting the angle formed by the longitudinal axis of the tooth and the plane of the film packet when it is in proper position for exposure, and also so that it will pass straight through the interproximal spaces.

Another object is to provide a device which will support the film without manipulation by the patient, to avoid bending of the film and insure that it lies flat during the exposure.

Another object is to provide a device in which a rigid support may be employed for supporting the film and further preclude its being bent.

A further object is to provide an improved means for supporting the film and one in which different widths of film may be held and automatically positioned so that the central ray from the X-ray cone is automatically centered on the film in the projection.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 1 is a top plan view of the device and the X-ray cone showing their relative positions;

Fig. 2 is a side elevation of the X-ray cone and part of the positioning means, with parts broken away to more clearly show the construction;

Fig. 3 is a front view of the device looking toward the bottom of Fig. 1;

Fig. 4 is a detail view showing one of the aligning elements on the cone swung up out of position;

Fig. 5 is a detail section substantially on line 5—5 of Fig. 3, showing a tooth on the tooth table, the film, however, being shown parallel to the axis of the tooth;

Fig. 6 is a detail section substantially on line 6—6 of Fig. 3;

Fig. 7 is a perspective view of the inner end of the supporting housing;

Fig. 8 is a front view of the device with the end housing in longitudinal section;

Fig. 9 is a front elevation of the inner shaft removed from the housing;

Fig. 10 is a section on an enlarged scale substantially on line 10—10 of Fig. 8;

Fig. 11 is a similar section substantially on line 11—11 of Fig. 8;

Fig. 12 is an end view of the device showing it in full lines in a hypothetical position parallel to the axis of the tooth and showing in dotted lines how it and the cone may be positioned so that the central ray is perpendicular to the angle bisecting the axis of the tooth and the plane of the film, but in order to make the drawing clearer, the film is placed at a greater angle to the axis of the tooth than it would be when placed in the proper position against the tissues of the mouth at the back of the tooth when in the proper position for exposure;

Fig. 13 is a diagrammatical view showing the angles involved, and the position of the device as in Fig. 12;

Fig. 14 is an end view of the device showing a modification;

Fig. 15 is a diagrammatical view showing the angles involved in the device of Fig. 14;

Fig. 16 is an end view of the device showing another modification;

Fig. 17 is a perspective broken view of an improved film packet which may be used for this device;

Fig. 18 is an exploded view of the film packet of Fig. 17 showing the different elements in perspective;

Figs. 19 to 23 are views showing the different shapes and sizes of film packets which may be used;

Fig. 24 is an edge view of the lower end of a film packet, and

Fig. 25 is a side view of an instrument which may be used for opening the packet.

Referring first to the form of the device shown in Figs. 1 to 12, the device comprises a central shaft 1 of any suitable material, provided at one end with a transverse slot 2 tapered at its opposite ends 3 to receive the correspondingly tapered end 4 of the film packet 5. The shaft is made in sections 6 and 7, the section 6 being preferably of plastic, although it may be of any suitable material, and the section 7 being preferably of stainless steel. The section 7 is provided with a tapered socket from one end into which may be fitted a similarly tapered extension 8 on the section 6 to secure the two together and to properly position the two sections in the proper and correct axial relation, and to insure that they both rotate together the adjacent ends of the two sections are locked together by a key and slot connection 9.

This shaft is mounted in a hollow open-sided cylinder 10, preferably made of plastic, and at one end including a lateral extension forming a plate or tooth block 11 which may be molded integral with the member 10. The main portion of the member 10 is preferably substantially semi-cylindrical so that it is open at one side to expose the shaft 1, as shown in Figs. 1, 3, 5, 6 and 8, and at the opposite end from the bite block 11 includes an integral collar 12 in which the shaft 1 has a bearing, and at its opposite end has a transverse end piece 13 in which the reduced end 14 of the shaft 1 is seated to form a bearing for the other end of the shaft. Collar portion 12 is mounted in a housing 15, preferably of stainless steel, which has a longitudinal rib 16 on its upper side, and on its inner lower wall has a key block 17 extending into an annular groove 18 in the collar 12 to retain this collar in the housing. If preferred, the collar 12 and the semi-circular cylinder 10 may be made in two pieces and secured together by a catch 19, as shown in Fig. 1, with a step joint 20 between the two sections so that they will turn together.

To one side outwardly of the groove 18 the collar 12 has another groove 21 with flats 22 on diametrically opposite sides in which may be seated the side arms 23 of a substantially U-shaped spring 24, seated at its upper end in a transverse groove 25 in the rib 16, and preferably the side arms are turned inwardly at their free ends 26 to grip under the lower part of the groove and yieldingly retain the spring in position. This spring permits turning of the cylinder 10 through a half revolution or an angle of 180° to permit locating the bite block 11 on diametrically opposite sides of the shaft 1 and therefore on diametrically opposite sides of the film packet 5, so that the device may be used in photographing upper or lower teeth. The spring retains it in either of these positions. The inner shaft 1 is provided with diametrically opposite lugs 27 and 28 to engage opposite ends of coil springs 29 and 30 embracing the shaft and enclosed within the housing 15 to form yielding abutments, the other ends of the springs being anchored respectively to the housing 15 to permit turning of the shaft in either direction but to place tension on the shaft and tend to swing it to and hold it in the normal intermediate position of Figs. 1, 2 and 12, with the film parallel to the axis of the tooth or at right angles to the plane of the bite block or tooth table 11. The collar 12 is provided with longitudinal grooves 31 and 32 leading from its inner end to the annular groove 18 and 90° apart, as shown in Fig. 10, to permit insertion of the cylinder 10 and the bite block in the housing at different angular positions, these grooves 31 and 32 being for passage of the key block 17 in the housing 15 to the groove 18 to lock the two members together.

The inner end of the shaft has a bearing 33 in the outer end of the housing 15 and is reduced, at 34, to receive a small gear 35 which is secured to the shaft by any suitable means, such, for example, as the key 36. The housing has an upper extension 37 carrying a pin 38 on which is mounted an intermediate idler gear 39 meshing with a gear segment 40 pivoted on a second pin 41, the segment 40 having an upward extension 42 carrying at its upper end a cross bar 43 forming an indicator or angulator arm guide. The two gears 35 and 39 are the same size or pitch diameter, while the segment 40 has a pitch radius of twice the radius of the gears 35 and 39, so that on turning movement of the shaft 1 and gear 35 the segment 40 and the angulator arm guide 43 will swing through only half the angle at which the shaft and the film packet carried thereby swing. The ends of the shaft 1 and the supporting pins 40 and 41 may have annular grooves to receive a U-shaped spring locking wire 44 to retain these gears and the segment 40 in place. This may be easily removed to permit changing of the gears or segment, or for cleaning purposes.

The cone of the X-ray machine is indicated at 45, the rays being projected from the tip of this cone, the central ray being of course projected substantially on the center line 46. The device for positioning this cone with respect to the tooth and sensitive film comprises a ring or plate 47 of plastic embracing the base of the cone and held in position thereon by a rubber washer 48. This ring carries two guide arms 49 located on diametrically opposite sides of the cone and extending perpendicularly to the ring or plate 47 or that is, parallel to the central ray of the cone. Each is hinged to extension arms 50 of the ring or plate 47, as indicated at 51, so that if desired they may be swung up out of the way against the face of the plate 47 when not in use and held in this position by a spring clip 52.

As above indicated, the springs 29 and 30 tend to turn the shaft 1 carrying the film 5 to a vertical or intermediate position with the bite block or tooth table 11 in a horizontal position, as shown in Figs. 1, 3, 5 and 12. That is, to hold the film at right angles to the plane of the bite block. In this position the plane of the film or its center line 53 would be parallel to the center line or axis 54 of the tooth held against the block. However, due to the shape of the mouth and the shape and location of the tissues of the gums back of the tooth, it would be impossible to have the film parallel to the axis of the tooth when making an exposure, but the film must be swung backwardly, or to the left in this position, as viewed in Fig. 12, and when it rests against the back crowns of the tooth and back of the free edge or tissues of the gums in the back of the tooth, it will lie at an angle to this axis. Therefore, to secure the best and most accurate image, the central ray from the X-ray machine, indicated by the line 46, should be perpendicular to a plane bisecting the angle between the axis 54 and the center line 53 of the film, because if it were perpendicular to the axis 54 it would be at too great an angle to the plane of the film, giving a distorted image, and if it were perpendicular to the plane of the film it would be at too great an angle to the axis of the tooth, also giving a distorted image. Therefore, the image with the least distortion is secured when the central ray is projected perpendicular to a plane bisecting the angle between the axis of the tooth and the plane of the film.

In placing the device in the mouth of the patient, if we assume a photograph is to be taken of some of the upper teeth, as indicated at 55 in Fig. 12, after placing the film pack in the slot 3 in the shaft 1 by which it is snugly held, it is swung backwardly so that it may be inserted in the mouth of the patient back of the upper teeth, and the bite block or tooth table 11 placed against the crowns, as indicated in Fig. 12. Film 5, as shown in this view, is swung backwardly for insertion into the mouth, and after the bite block is in position the film is released and is swung by one of the springs 29 or 30 forwardly to position the film against the back of the teeth and against the back of the gums or tissues from which the teeth project. This would be a smaller angle than that indicated by the dotted lines 53b Fig. 12, but in order to have larger angles the film is shown at a greater angle than it would normally take when in position for the actual taking of the photograph. When this film 5 is swung back from the vertical position 53a to the position 53b, it swings through the angle 53c, turns the shaft 1 through the same angle, and at the same time turns the gear 35 the same amount. This gear operating through the idler 39 swings the segment 40 to the right and the cross bar or angulator arm guide 43 in the same direction as movement of the film, or to the left through angle 57 to the dotted line position Fig. 12, but as the ratio of the radius of gears 35 and 39 to the segment 40 is one to two, this segment and the bar 43 move only half the angle 53c through which the film was shifted, or that is, through the angle 57. The center line of the extension indicated at 58 is in this position parallel to the line 59 which bisects the angle 56 between the axis 54 of the tooth and the center line 53b of the film 5. Therefore, in any position of the film the center line 58 of the extension 42, which is at right angles to the center line 43c of the angulator arm guide 43, is always parallel to the line or plane bisecting the angle between the tooth axis 54 and the plane of the film. It will thus be seen, if the cone 45 is shifted so that its axis is parallel to the axis of the bar 43, the center ray will be projected perpendicularly to the plane of the angle bisecting the angle between the axis 54 and the film 5. If the arm 49 is positioned with its axis 49a parallel with the axis of the cone and in the same horizontal plane, the cone is tipped so that the arm 49 is in alignment with the arm or bar 43, as indicated in dotted lines Fig. 12, and the central ray will be projected from the cone at right angles to or perpendicular to the plane of the angle bisecting the angle between the axis 54 of the tooth and the film 5, which is the ideal position. The bite block or tooth table 11 has a central line 59, Fig. 1, marked on it, to assist in locating the cone in the vertical central plane of the film, as indicated in Fig. 1, but by positioning the two indicating bars 48 and 49 in alignment, in this plane, as shown in Fig. 1, as well as in the inclined plane, as shown in Fig. 12, the cone will be properly centered on the film. The central line 59 also is used to properly position the film and bite block in the mouth with relation to the teeth.

If it is desired to photograph the lower teeth, the bite block or tooth table 11 may be swung through an angle of 180° from the positions of Figs. 1, 3 and 5, or to the diametrically opposite side as indicated by dotted line position of Fig. 1, this motion being permitted by the spring 23, and it will be retained in this position by the spring seating on the flats 22.

In the modification shown in Figs. 14 and 15, instead of the gear 35 on the shaft 1 meshing with an idler gear, which in turn meshes with a segment, as shown in Fig. 12, gear 35 meshes with an internal gear 60 which has a pitch diameter twice that of the gear 35. This internal gear is in in a housing 61 connected with the extension 62 similar to the extension 42 and which carries the transverse bar or angulator arm guide 43 at right angles to the extension 62. Therefore, as the film packet 5 is swung from the vertical upright position 5a to the dotted line position, it turns the shaft 1 and with it the gear 35, and through gear 61 the bar 43 and extension 62 will be swung in the same direction to the dotted line position, but due to the gear ratios of one to two it will be swung through only half the angle through which the film packet 5 is swung, so that the axis 63 of the extension is swung through the angle 63a and is parallel to the plane 64a bisecting the angle 64 through which the film packet has been shifted, and therefore the bar 43 is perpendicular to the plane of this axis 63 and this axis is also parallel to the line 65 bisecting the angle between the tooth axis 54 and the axis 53b of the film packet 5 in its dotted line position. The cone 45 of the X-ray machine may then be positioned the same as in the first form by lining up one of the guide arms 49 with the bar or arm 43, the same as indicated in dotted lines, Fig. 12, so that the center ray of the cone is perpendicular to the plane (in the illustration plane 65) bisecting the angle between the tooth axis 54 and the axis of the film 5.

A slightly different modification is shown in Fig. 16. In this case, the gear 35 on the shaft 1 meshes with a half internal gear 66 below it in the housing 67, the pitch of this gear being of a radius twice that of the gear 35. Connected to this housing is an extension 68 similar to the extension 62 in Figs. 14 and 15 carrying at right angles to it the cross bar or angulator arm guide 43. This operates in the same way as the device of Figs. 14 and 15, the central line or axis 69 swinging through an angle half that through which the film packet and the shaft 1 turn. For a bite wing film, a horizontal marking, indicated at 70 and of a width of the guide arm 43 and parallel to it may be inscribed on the upright 68 or a telescope arrangement or other adjustable mounting, which would permit the arm 43 to be dropped to this position or level, so as to have the central ray in a line with the film.

In any of these forms of the device the apparatus is used by inserting the film packet in the angulator, and by inserting it in the slot 2 in the shaft 1 and positioning it in the mouth with the aid of the guide line 59 (Fig. 1), and then having the patient bite onto the block or plate 11 after the film packet 5 is positioned against the back of the teeth or gums or tissue to position the angulator arm guide 43, the cone is positioned by lining up either one of the arms 49 with the arm 43, as shown in Figs. 1 and 12.

A special film packet is designed for use in this device, although the regular film packet, as indicated at 5, may be used. This film packet has an extension 71 with inclined ends 72 to fit the inclined ends 3 of the slot 2 in the shaft 1. By using this extension it can always be made of the same length with the same taper, regardless of the width and length of the film packet, and therefore film packets of different widths and lengths, as indicated by the dotted lines 73 to 82, of Figs. 20 to 23 may be used, each having the extension 71 to fit the slot 2 of the shaft 1, and the center line of each film located on the center line of the extension, as indicated at 83 in each instance. Any one of these packets of the shape and size indicated, when the tapered extension is inserted in the slot, will be automatically centered with respect to the slot and also with respect to the center line or locating mark 59 (Fig. 1) on bite block or tooth table 11, and therefore when located in the mouth with this device and the cone positioned and aligned therewith as pointed out above, the center ray of the cone will always be in the center of the film for most accurate results and least distortion of the image.

In the film packet of Figs. 17 and 18, the intermediate element 84 is a sensitized film on the opposite sides of which are black sheets 85 of plastic or celluloid to keep out light and give rigidity to the packet, or one of these may be plastic and the other black paper, depending on how much of this property of rigidity is desired. Back of the rear sheet 85a is the lead foil 86 to stop the X-rays, and this extends to the bottom of the sheets 85 while the film 84 extends only to about the level of the top edges of the extension 71. Outside of the forward plate 85 and the foil 86 are the outside wrappers 87 which may also be black paper. Each of the outside wrappers 87 and the plates 85 are extended at their lower ends to form the extension 71, as indicated, which, when the elements are all assembled may fit snugly in the slot 2 in the shaft 1 and be properly positioned and centered by the inclined ends 3 and 71, and the packet will be held rigid and flat because of the rigidty imparted by the elements 85.

To facilitate opening of the packet for developing the film after exposure, it may be provided at its lower end with a tapered socket 87 extending inwardly from its lower edge of a thickness substantially that of the film and tapered to receive a similarly tapered head piece 88 of a small tool 89. It may have a substantially flat handle so that after insertion of the head 88 in the socket 87 it may be turned or pried laterally to separate the elements enclosing the film 84, or in other words opening the packet, so that the film may be easily removed for developing.

It will be clearly understood from the above that it is a simple matter to slip the film packet in the holding slot in the shaft and that this action automatically properly positions it therein, and it will be rigidly held in this proper position. Then the packet may be inserted in the mouth at the back of the teeth to be X-rayed, and after the patient has bitten on the block 11 and the film released, it is automatically positioned at the back of the teeth and held in this position by one of the springs 29 or 30. At the same time, the angulator arm guide 43 is automatically positioned at right angles to the plane bisecting the angle between the axis of the tooth and the plane of the film, and then by locating the cone of the X-ray machine by lining up one of the arm guides 49 with the arm guide 43, the cone is so positioned that the central ray is not only centered on the film but is perpendicular to the plane bisecting the angle between the axis of the tooth and the plane of the film, which is the position which gives the photographic image of the least distortion. Furthermore, as the film packet is held by this device, and not by the patient, it is held flat in the proper position and not bent out of shape, still further obviating a distorted image.

Having thus set forth the nature of my invention, I claim:

1. A device for positioning an X-ray film in a patient's mouth comprising an element adapted to engage teeth to be positioned thereby, a supporting shaft for the film mounted adjacent said element to turn relative thereto, means for mounting a film on the shaft in a plane parallel to the shaft, a support connected with said element and comprising a pivoted arm mounted to swing relative thereto, a gauging means mounted on said support comprising a cross bar on the arm spaced laterally from its pivot and extending transversely of the axis of the shaft, and a gear connection between the shaft and the support having a ratio of two to one so that swinging movement of the film will swing the support through an angle half that of movement of the film and so arranged that the cross bar is at right angles to a plane bisecting the angle between the plane of the film and the axis of the teeth being X-rayed.

2. A device for positioning an X-ray film in a patient's mouth comprising a bite block adapted to be gripped and held between the upper and lower teeth, a shaft mounted to turn relative to said block and provided with means for mounting the film adjacent the block parallel to the shaft and in position to rest at the back of one set of the teeth, resilient means tending to turn the shaft to hold the film against the teeth, a support comprising a pivoted arm mounted to turn relative to the block, a gauging means mounted on the support comprising a cross bar mounted on the arm spaced laterally from its pivot and extending transversely of the shaft, and a gear connection between the shaft and the support having a ratio of one to two so that swinging movement of the film will shift the support and gauging means through an angle one-half that of the movement of the film and so arranged that the cross bar is at right angles to a plane bisecting the angle between the plane of the film and a plane at right angles to the plane of the block.

3. A device for positioning an X-ray film in a patient's mouth comprising a bite block adapted to be gripped between the upper and lower teeth, a support for a film adjacent said block mounted to turn relative thereto about an axis parallel with the plane of the film to position the film back of one set of teeth and at various angles to the block, a normally stationary supporting housing connected with the block, a gauging means mounted on the housing to swing relative to the block to positions at different angles relative thereto, said gauging means comprising an arm pivotally mounted in the housing and a gauge bar mounted on said arm extending transversely thereof and transversely of said axis and spaced from the pivot mounting for the arm, and a gear connection between the film support and the bar having a ratio of one to two so that swinging movements of the film relative to the block will swing the gauge bar through an angle one-half that of the film movement and so arranged that the bar is perpendicular to the plane of the angle bisecting the angle between the plane of the film and a plane at right angles to the plane of the block.

4. A device for positioning an X-ray film in a patient's mouth comprising a bite block adapted to be gripped between the upper and lower teeth, a support for a film adjacent said block mounted to turn relative thereto about an axis with the film parallel to said axis to position the film back of one set of teeth and at various angles to the block, a gauge bar extending transversely of said axis and mounted to swing relative to the block to positions at different angles relative thereto, an operative connection between the film support and the gauge bar adapted on swinging movement of the film relative to the block to shift the gauge bar relative to the block through an angle one-half that of movement of the film, and gauging means associated with the projection cone of an X-ray machine adapted to be positioned relative to said gauging bar to position said cone relative to the film.

5. A device for positioning an X-ray film in a patient's mouth comprising a bite block adapted to be gripped between the upper and lower teeth, a support for a film adjacent said block mounted to turn relative thereto about an axis with the film parallel to said axis to position the film back of one set of teeth and at various angles to the block, a gauge bar extending transversely of said axis and mounted to swing relative to the block to positions at different angles relative thereto, a gear connection between the film support and the bar having a ratio of one to two so that swinging movement of the film relative to the block will swing the gauge bar through an angle one-half that of movement of the film, a ring adapted to be positioned on the projection cone of an X-ray machine, and a gauge bar on said ring adapted to be positioned in alignment with the first gauge bar to position said cone relative to the film.

6. A device for positioning an X-ray film in a patient's mouth and positioning the projection cone of an X-ray machine relative to said film, comprising means cooperating with the teeth to be photographed to position the film back of the teeth, means for mounting the film to swing relative to said first means about an axis with the film parallel to said axis to position the film, an angulator arm gauge adjacent the film extending in a direction transversely of said axis and shiftable with the film to various angles with respect to the axis of the teeth, an operative connection between the film and the arm gauge arranged when the film is in position for exposure to position the arm gauge perpendicular to a plane bisecting the angle between the axis of the teeth and the plane of the film, a support adapted to be connected with the projection cone of the X-ray machine, and a gauge arm on said support adapted to be aligned with the first arm gauge to position the central ray of said cone perpendicular to said bisecting plane.

7. A device for positioning an X-ray film in a patient's mouth and positioning the projection cone of an X-ray machine relative to said film, comprising means cooperating with the teeth to be photographed to position the film back of the teeth, means for mounting the film to swing relative to said first means about an axis with the film parallel to said axis for positioning the film, and angulator arm gauge adjacent the film comprising a pivoted arm and a transverse bar at right angles to said axis spaced laterally from the pivot forming an indicator, said arm and bar being shiftable with the film to various angles with respect to the axis of the teeth, and an operative drive connection between the film and the arm gauge arranged when the film is in position for exposure to position the indicator bar of the arm gauge perpendicular to the plane bisecting the angle between the axis of the teeth and the plane of the film.

8. A device for positioning an X-ray film in a patient's mouth and positioning the projection cone of an X-ray machine relative to said film, comprising a bite block adapted to be gripped between the upper and lower teeth, a shaft mounted adjacent said block for turning movements relative thereto, means on said shaft for supporting the film parallel to the shaft and at the back of certain teeth when the block is so gripped, an angulator gauge arm mounted for swinging movements relative to said block in a plane extending transversely of the shaft, a gear connection between the shaft and said arm to position the arm perpendicular to the plane bisecting the angle between the axis of the teeth adjacent the film and the plane of the film, a support adapted to be connected with the projection cone of the X-ray machine, and a gauge arm on said latter support parallel to the center ray of the cone adapted to be aligned with the first gauge arm to position the cone so that said center ray is perpendicular to said bisecting plane.

9. A device for positioning an X-ray film in a patient's mouth and positioning the projection cone of an X-ray machine relative to said film, comprising a bite block adapted to be gripped between the upper and lower teeth, an open sided cylinder secured to the block and extending from one end thereof parallel to the plane of the block, a shaft mounted in the cylinder adjacent said block for turning movements relative thereto, means on said shaft at the open side of the cylinder for supporting the film in a plane parallel to the shaft and at the back of certain teeth when the block is so gripped, a normally stationary housing secured to the cylinder by means permitting location of the cylinder in different angular positions about the shaft to position the block on opposite sides of the film, an angulator gauge arm mounted on the housing for swinging movements relative to said block, and a gear connection on the housing between the shaft and said arm having a ratio of one to two to position the arm perpendicular to the plane bisecting the angle between the axis of the adjacent teeth and the plane of the film when the film is in position for exposure.

10. A device for positioning an X-ray film in a patient's mouth and positioning the projection cone of an X-ray machine relative to said film, comprising a bite block adapted to be gripped between upper and lower teeth, an open sided cylinder secured to and extending from one end of said block, a shaft mounted to turn in said cylinder and provided with means for supporting a film parallel to the shaft adjacent said block and to project through the open side of the cylinder, a normally stationary housing, means for mounting the cylinder in the housing for turning movements to position the block at different angular positions with respect to the housing and on opposite sides of a film carried by the shaft, movable gauging means mounted on the housing, and an operative connection from the shaft to the gauging means to position said means with respect to the film and said block.

11. A device for positioning an X-ray film in a patient's mouth and positioning the projection cone of an X-ray machine relative to said film, comprising a bite block adapted to be gripped between upper and lower teeth, an open sided cylinder secured to and extending from one end of said block, a shaft mounted to turn in said cylinder and provided with means at the open side of the cylinder for supporting a film adjacent said block and parallel to the axis of the shaft, a normally stationary housing in different angular positions about the shaft to locate the block on opposite sides of the film, means for mounting the cylinder in the housing, a gauging means pivotally mounted on the housing to swing to different angles relative to the block, a gear connection between the shaft and gauging means, and spring means in the housing tending to turn the shaft to a position where the film is perpendicular to the plane of the block.

12. A device for positioning an X-ray film in a patient's mouth at the back of the teeth to be photographed, comprising a biting block adapted to be gripped between the upper and lower teeth, a shaft mounted to turn relative to the block and provided with means to support the film adjacent the block and parallel to the axis of the shaft, an open sided cylinder embracing the shaft and secured to the block with the film at the open side of the cylinder, a normally stationary housing secured to the cylinder by means permitting turning of the cylinder to locate the block on opposite sides of the film, and yielding means in the housing tending to turn the shaft to hold the film against the back of the teeth when the block is so gripped.

13. A device for positioning an X-ray film in a patient's mouth comprising a normally stationary housing, an open sided cylinder mounted for turning movement in the housing, a bite block carried by the cylinder and adapted to be gripped between upper and lower teeth, a shaft mounted in the cylinder and housing and provided with means for supporting a film parallel to the shaft adjacent the block and to extend through the open side of the cylinder, and means in the housing for yieldingly retaining the cylinder in different angular positions about the shaft to position the block on opposite sides of the film held by the shaft.

14. A device for positioning an X-ray film in a patient's mouth, comprising a housing, an open sided cylinder mounted for turning movement in the housing, a bite block carried by the cylinder and adapted to be gripped between upper and lower teeth, a shaft mounted in the cylinder for turning movements relative to the block and housing and provided with means for supporting a film to extend through the open side of the cylinder adjacent the block and parallel to the shaft, spring means in the housing tending to turn the shaft to position the film at substantially right angles to the plane of the block, and means in the housing for retaining the cylinder in different angular positions about the shaft to locate the block on opposite sides of the film held by the shaft.

15. A device for positioning an X-ray film in a patient's mouth, comprising a bite block adapted to be held between the upper and lower teeth and provided with means to indicate the center line of the block, a shaft mounted for turning movement relative to the block and provided with a longitudinal slot adjacent the block having inclined ends each located in a predetermined relation to the said indicating means, a substantially flat film holder including an edge portion seated in said slot and having inclined ends to engage the inclined ends of the slot to position said holder in a given position with relation to the block and parallel with the shaft, and spring means tending to turn the shaft relative to the block to retain the holder against the back of one set of the teeth holding the block.

ISADORE SHAPIRO.

REFERENCES CITED

The following references are of record in the file of this patent:

UNITED STATES PATENTS

| Number | Name | Date |
| --- | --- | --- |
| 1,536,341 | Hodgson | May 5, 1925 |
| 2,090,933 | Bolin | Aug. 24, 1937 |
| 2,123,210 | Schantz | July 12, 1938 |
| 2,127,365 | McHugh | Aug. 16, 1938 |
| 2,127,502 | DeWeal | Aug. 23, 1938 |
| 2,193,993 | DeWeal | Mar. 19, 1940 |